N. L. BARGER AND J. P. DONALDSON.
LOADING MACHINE.
APPLICATION FILED JUNE 24, 1921.
Reissued Nov. 29, 1921.
15,234.
2 SHEETS—SHEET 1.
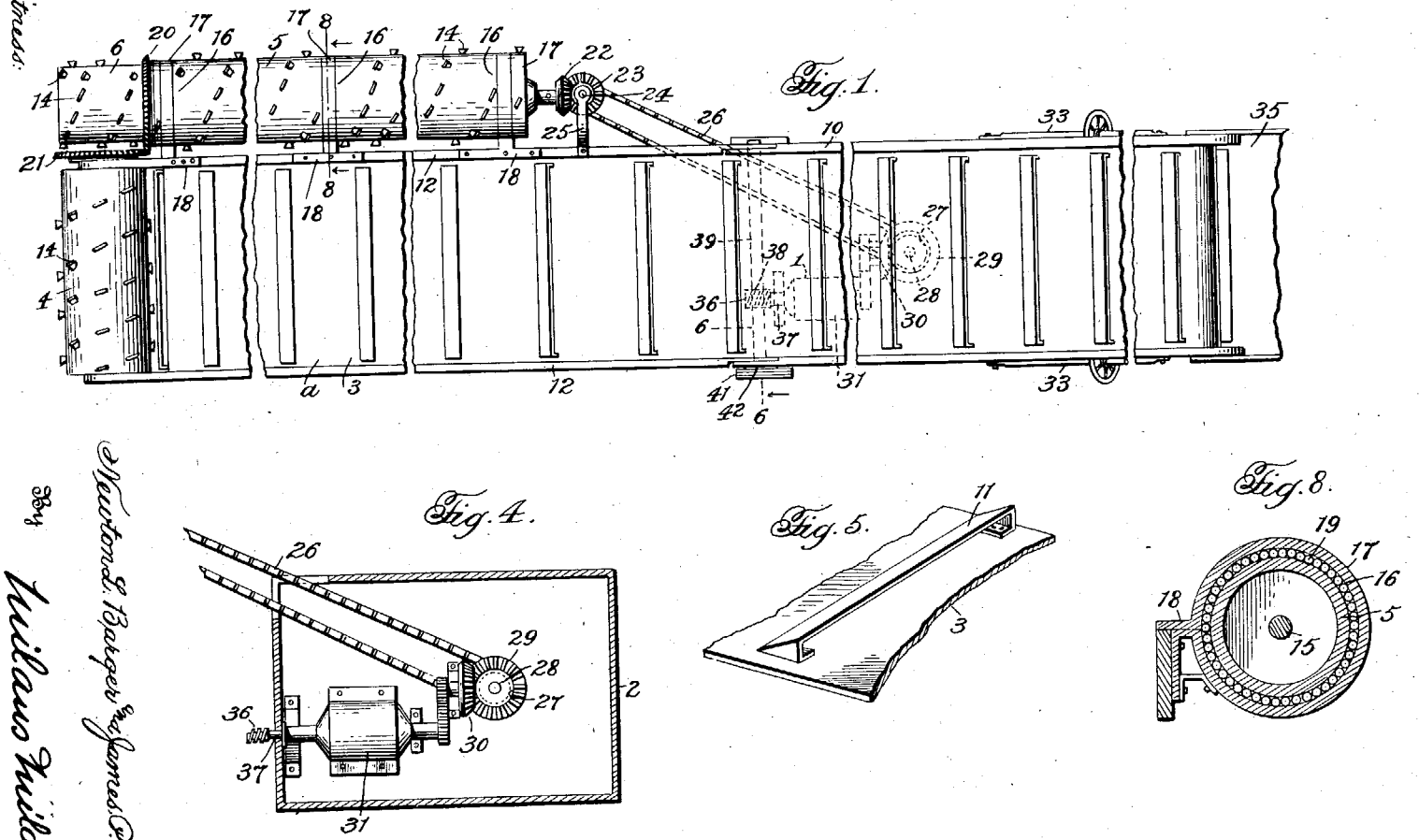
Witness:
Jas. L. Hutchinson:
Inventor:
Newton L. Barger and James P. Donaldson,
By Milans Milans
Attorneys:

N. L. BARGER AND J. P. DONALDSON.
LOADING MACHINE.
APPLICATION FILED JUNE 24, 1921.
Reissued Nov. 29, 1921.
15,234.
2 SHEETS—SHEET 2.
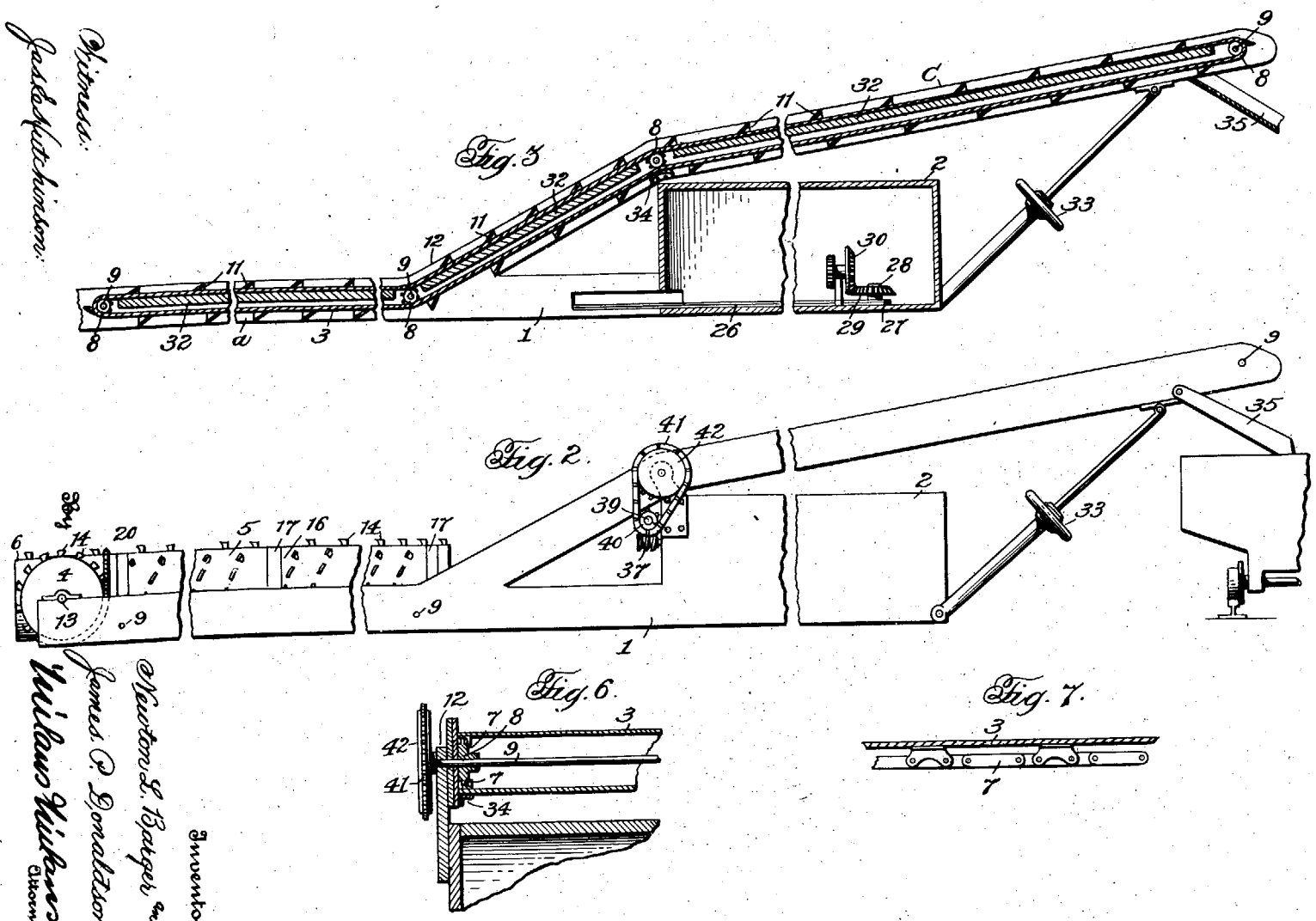
Witness:
Jas. L. Hutchinson.
Inventors:
Newton L. Barger and
James P. Donaldson,
By Williams & Williams
Attorneys.

UNITED STATES PATENT OFFICE.

NEWTON L. BARGER, OF BRAEHOLM, AND JAMES P. DONALDSON, OF MORGANTOWN, WEST VIRGINIA, ASSIGNORS, BY DIRECT AND MESNE ASSIGNMENTS, TO FORD-BARGER MACHINERY CO., OF BRAEHOLM, WEST VIRGINIA, A CORPORATION OF WEST VIRGINIA.

LOADING-MACHINE.

15,234. Specification of Reissued Letters Patent. Reissued Nov. 29, 1921.

Original No. 1,307,335, dated June 24, 1919, Serial No. 210,186, filed January 3, 1918. Application for reissue filed June 24, 1921. Serial No. 480,234.

*To all whom it may concern:*

Be it known that we, NEWTON L. BARGER and JAMES P. DONALDSON, citizens of the United States, residing at Braeholm, in the county of Logan and State of West Virginia, and at Morgantown, in the county of Monongalia and State of West Virginia, respectively, have invented certain new and useful Improvements in Loading-Machines, of which the following is a specification, reference being had to the accompanying drawings.

This invention relates to mining machinery and has particular reference to machines for gathering and loading coal in coal mines.

The object of the invention is to provide a machine for practically and rapidly removing coal from a chamber after a mass has been "shot." The usual method of mining coal comprises the drilling of holes into the body of the vein, and the explosion therein of a suitable explosive to blast out fragments which are afterward loaded into cars for transportation from the mine. It is a common, though not universal, practice to form kerfs in the coal body, usually as near the mine floor as possible, to facilitate the breaking down of the coal above the kerf. These kerfs are commonly formed by mining machines having supporting devices positioned in a somewhat lower plane than the cutting devices by which the kerfs are produced, resulting in an uneven floor composed of a succession of off-sets, or steps. Numerous attempts have been made to adapt loading machines, comprising conveyers associated with gathering devices of various sorts, to the mechanical taking up of the loose, broken coal from the floor of the mine and loading it into suitably positioned cars for transportation from the mine. The irregularities of the mine floor produced by the action of the mining machines above referred to, or to the irregular breaking of the coal, when no under kerf is formed, have constituted obstructions which seriously militated against the economical operation of loading machines such as have been heretofore constructed. Frequently the force of the blast is expended without thoroughly disrupting the coal and the broken coal is left standing in comparatively large fragments interlocked in a mass too compact to be handled by the gathering devices of the machines heretofore constructed, entailing considerable manual labor for their dislodgment preparatory to loading.

It is the especial object of this invention to provide a machine for practically and rapidly removing the coal from the floor of the mine chamber after the mass has been shot, and loading said broken coal into cars suitably positioned upon the mine track in the rear of the machine.

A further object is to provide a machine of the class described which will dislodge the bottom coal adhering to the sub-stratum, thereby providing an even floor over which the loading machine may be advanced.

A further object is to provide a machine of the class described having gathering devices adapted to engage masses of coal which have been partially shattered by the blast, and complete its disruption to render possible the gathering and loading of the fragments for transportation.

With the above objects in view, and such others relating to the details of construction, as may hereinafter appear, our invention will now be fully set forth and described, reference being had to the accompanying drawings.

In the drawings:

Figure 1 is a plan view of the machine.

Fig. 2 is a side elevation.

Fig. 3 is a longitudinal section therethrough.

Fig. 4 is a view of the power plant.

Fig. 5 is a detail perspective view of the conveyer belts.

Fig. 6 is a section on lines 6—6 of Fig. 1.

Fig. 7 is a further sectional detail view of the conveyer mechanism, and

Fig. 8 is a section on lines 8—8 of Fig. 1.

Referring more particularly to the drawings, 1 represents the base or frame machine, upon whose rear end is raised the casing or housing 2 within which the driving mechanism of the machine is carried. In all of its essential particulars the motive power which is housed within the casing 2 may be similar to that which is used upon an undercutting mining machine, such for instance as illustrated in Patent No. 1,169,-842, issued February 21, 1916, to N. D. Levin, and the progress and operation of the machine may be controlled in like manner. Thus, the machine will be provided with the usual system of drums and cables which, with the coöperation of jacks will be manipulated to cause the machine to progress forwardly or sidewise through the coal pile. Since this mechanism forms no part of the present invention, it is not deemed necessary to illustrate the same in detail herein.

The loading mechanism of this invention, consists, essentially, of an elevating conveyer 3, a forward gathering roller 4, a set of side gathering rollers 5 and an intermediate roller 6, the rollers 4, 5 and 6 coöperating to take the coal from the pile and deposit it on the conveyer by means of which it will be carried to the mine cars for transportation.

The conveyer 3 is formed of one continuous flexible belt having the side chains 7 which operate over sprockets 8 carried by shafts 9. Said shafts 9 which have their bearings in the sides 10 of the framework, divide the belt 3 into three flights, a horizontal flight *a*, an intermediate flight *b*, and a delivery flight *c*. The flight *a* is horizontal, and receives the coal which is delivered by the rollers 4, 5 and 6, whence it is carried onto the flight *b* and finally is delivered from the flight *c*, the buckets 11 which are carried by the belt 3, insuring the continuous progress of the coal with the belt.

The rollers 4, 5 and 6 are positioned parallel with and in close proximity to the mine floor and inclose one side and the free end of the flight *a* of the conveyer. The opposite side of the flight *a* is inclosed by a comparatively high side board or guard plate 12 which constitutes in effect a continuation of the side board 10 upon the corresponding side. The roller 4 is mounted upon the shaft 13 extending across the front end of the frame structure and carries upon its periphery a number of spiral series of cutter blades or teeth 14. The blades or teeth 14 serve to lift the coal, and exert a partial disintegrating action upon the larger lumps, where the latter prove too heavy to be conveniently manipulated by the roller. The tearing action produced by the upward and inward movement of the cutter blades or teeth 14 also tends to dislodge the firmly interlocked fragments of coal at the base of the pile and permit the material above to fall upon the conveyer without assistance from the hand of the operator. Also the spirally arranged teeth are so mounted that the coal which is carried over the roller 4 is thrown toward the guard plate 12 so that its tendency is to hug the latter as the belt 3 progresses toward the upper flights. The roller 5 extends practically throughout the length of the flight *a*, and carries an axial shaft 15 which is fixed within the heads of the roller, the latter being preferably formed as a hollow metal drum. Formed in the periphery of the drum at suitable intervals is a plurality of bearing grooves 16 within which are received the bearing rings 17 which form part of brackets 18 extended from the side of the main frame structure. Preferably, ball bearings 19 are interposed between the rings 17 and the grooves 16 in order to avoid as far as possible the bearing frictions. The roller 5 also has the series of spirally arranged teeth 14, which attack the coal pile so as to carry the coal onto the conveyer belt 3, and then to move it toward the forward end of the flight *a* in accordance with the progress of the conveyer. At the outer end of the drum 5 the shaft 15 is extended a distance which approximates the diameter of the roller 4, and upon the extended end of the shaft there is mounted the short roller 6 which is also provided with the spiral series of teeth 14, so that the coal which backs up is thrown over its periphery and toward the angle between the rollers 4 and 5 and also upon the roller 4. Between the rollers 5 and 6 there is mounted in any suitable manner the bevel gear 20 which meshes loosely with a second bevel gear 21 mounted upon the end of the shaft 13 of the roller 4, the shaft of the roller 5 thereby driving both the drums 4 and 6.

The opposite end of the shaft 15 is provided with a bevel gear 22 which, in turn, stands in mesh with a bevel gear 23 carried upon a vertical stub shaft 24. The vertical shaft 24 is mounted in a bearing bracket 25 extended from the side of the main frame, and also carries the sprocket over which a sprocket chain 26 operates. The opposite end of the sprocket chain then passes over a sprocket wheel 27 which is mounted upon a stub shaft 28 within the housing 2, the latter, in turn, through the bevel gears 29 and 30 being geared to the power shaft of the motor 31. In this manner, the motive power for the rollers 4, 5 and 6 is furnished through a single driving element.

As a means to aid the conveyer belt 3, in its several flights, to support the load upon its upper run, we place the supporting plates 32 between the runs at the different flights, the plates 32 being carried by the side elements of the frame structure, and extending practically throughout the length of the several flights. The frame elements which support the flight *c* form a unit aside from the main frame structure, to which the unit is hinged on the axis of the shaft 9 between the flights *b* and *c*, and the delivery end of the adjustable flight *c* is supported by means of a jack 33 of ordinary construction which is interposed between the lower side of the movable unit and the base 1. In order to hold the lower run of the belt 3 into the obtuse angle between the flights *b* and *c*, we place the guard plates 34 which overlie the edges of the belt and the chains 7 upon which the belt is mounted. At the delivery end of the flight *c*, we place a chute 35 which will break the fall of the coal from the end of the flight and aid in delivering the coal into the mine cars. The belt 3 is driven from a worm 36 which is mounted upon the shaft 37 of the motor 31, said shaft 37 extending through the forward end of the casing 2, and carrying upon its extended end the worm 36. Meshing with the worm 36 is a worm gear 38 mounted upon a countershaft 39 extending across the frame structure. The counter shaft 39 also carries a sprocket wheel 40 upon its outer end upon which a sprocket chain 41 operates. The sprocket chain 41 also passes over a sprocket 42 carried upon the end of the shaft 9 between the flights *b* and *c*, the necessary power for the operation of the belt 3 being in this manner communicated from the motor 31.

In the operation of the above described machine, it is mounted in a gallery or chamber, after a mass of coal has been shot, in the same relation to the pile of coal that the cutting machine had for undercutting the face from which the pile was shot. Also, as heretofore stated, the machine is anchored to the jacks by means of cables whose opposite ends are wound upon the machine frame, in the same manner in which a coal-cutting machine is installed, for progressing it with relation to the face. Then the operating mechanism is started to drive the rollers 4, 5 and 6 and to drive the conveyer belt 3. By the manipulation of the controlling mechanism the machine is moved over the floor of the mine longitudinally to force the conveyer endwise of and laterally across the pile. The action of the rollers 4, 5 and 6 is to lift the coal from the pile against which the machine is driven, either longitudinally or transversely, and deposit it upon the lower end of the conveyer belt 3.

Since the rollers 4, 5 and 6 revolve in close proximity with the floor of the mine upon horizontal axes, it is apparent that any material projecting above the plane of the floor, such as the bottom coal left beneath the under kerf, or the irregularly broken surface of the bottom coal when no undercut has been formed, will be engaged and dislodged by the cutter teeth 14 and loaded onto the conveyer 3 thereby affording an even bottom upon which the machine may be conveniently advanced.

Frequently the coal is left standing in a comparatively compact mass of relatively large interlocked fragments. When the machine is fed forward against such a mass the cutter teeth 14, by their upward and inward movement, exert a tearing action which dislodges fragments from the bottom of the mass and allows the upper coal to fall upon the conveyer without assistance from the hand of the operator. If the coal is not sufficiently broken, the teeth upon the rollers sufficiently disintegrate the coal as the rollers operate thereagainst, to size the coal for lifting onto the belt. It will be noted that the rollers throw the coal longitudinally of the belt and also toward the guard plate opposite the roller 5, so that a proper progression of the coal after it has struck upon the conveyer 3 is insured. The conveyer belt 3 carries the coal to the upper end of the movable flight, and chutes into the coal cars in an obvious manner.

An important feature of the invention lies in the particular arrangement of the rollers 6 and 4 with respect to each other. It will be noted that, since the roller 6 extends across the end of the roller 4 and is mounted to rotate upwardly and inwardly toward the roller 4, coal contacted by the roller 6 and by its teeth will be carried by the roller 6 not only into the angle between the rollers 4 and 5, but also onto the roller 4 as well, from which roller the coal is thrown upon the conveyer and also urged toward the guard plate 12. Thus, not only is there provision for action upon a greater quantity of coal, through the added area of coal engaging surface represented by the roller 6, but this roller 6 also prevents the passage of lumps of coal into engagement with the end of the roller 4, which might interfere with the operation of this roller.

It will be apparent from the foregoing description that there has been provided a very practical machine for taking coal in the form in which it is left after a shooting and placing it directly into the mine cars, without the necessity of employing manual labor, in accordance with the method which has been heretofore in use.

After a vein has been undercut and shot, the cutting machine may be employed in another gallery or chamber, and the loading machine may be substituted therefor, to transfer the coal which has been brought down into cars.

While we have shown and described a preferred embodiment of our invention, it will be understood that various changes and modifications of the structure may be resorted to for differing conditions of use without departing in any manner from the scope of the appended claims. While we have shown no specific mounting for the inner end of the roller 4, such mounting may take the form of a ball bearing such as shown in connection with the roller 5.

What we claim as our invention is—

1. A loading machine, comprising in combination, a framework, a conveyer mechanism mounted upon the framework in elevating flights, and a series of rollers mounted around the receiving end of the conveyer mechanism to deliver material from a pile against which said rollers are brought onto said conveyer, one of said rollers extending across an end of another of said rollers and being arranged to rotate upwardly and inwardly toward said other roller.

2. A loading machine, comprising in combination, a framework, a conveyer mechanism arranged upon the framework in elevating flights, rollers arranged around the forward and one side edge of the receiving end of the conveyer mechanism, a guard plate extending along the other side edge, and means upon the rollers for directing material lifted by the latter onto the conveyer toward said guard plate.

3. A loading machine, comprising in combination, a framework, a conveyer mechanism arranged upon the framework in elevating flights, rollers arranged around the forward and one side edge of the receiving end of the conveyer mechanism, a guard plate extending along the other side edge, and spiral series of teeth arranged around the rollers so as to direct the material lifted by the rollers toward said guard plate and in the direction of operation of the conveyer mechanism.

4. In a machine for loading coal in mines, the combination with an elongated conveyer having a receiving portion extending in substantially horizontal planes adjacent the mine floor, means to move said conveyer laterally over said floor, a horizontal shaft extending longitudinally of said conveyer in advance of and parallel to its advancing side, a plurality of teeth attached to said shaft and adapted to engage material upon the mine floor as said conveyer advances, and means to cause the revolution of said shaft about its longitudinal axis to produce upward and inward movement of said teeth whereby said material will be transferred from said mine floor to said conveyer.

5. In a machine for loading coal in mines, the combination with an elongated conveyer having a receiving portion extending in substantially horizontal planes adjacent the mine floor, means to move said conveyer either laterally or longitudinally over said floor, a horizontal shaft extending longitudinally of said conveyer in advance of and parallel to its advancing side, a second horizontal shaft extending transversely of said conveyer in advance of and parallel to its advancing end, a plurality of teeth attached to said shafts and adapted to engage material upon the mine floor as the conveyer advances, and means to cause the revolution of said shafts about their longitudinal axes to produce upward and inward movement of said teeth whereby said material will be transferred from said mine floor to said conveyer.

6. In a machine for loading coal in mines, the combination with an elongated conveyer adapted to be moved laterally from the mine floor and having a receiving portion extending in horizontal planes adjacent the mine floor, and a gathering mechanism extending along the advancing side of said conveyer comprising a plurality of teeth adapted to engage material at the level of the mine floor as the conveyer advances, and means to impart upward and inward movement to said teeth whereby said material will be transferred from said floor to said conveyer.

7. In a machine for loading coal in mines, the combination with an elongated conveyer having a receiving portion extending in horizontal planes adjacent the mine floor, said conveyer being adapted to move in any preferred direction over said floor, and a gathering mechanism extending along more than one edge of said conveyer and comprising a plurality of teeth adapted to engage material at the level of the mine floor as the conveyer advances, and means to impart upward and inward movement to said teeth whereby said material will be transferred from said floor to said conveyer.

8. In a machine for loading coal in mines, the combination with a supporting frame adapted to rest upon and slide in any direction over the floor of the mine, of an elongated conveyer having a receiving portion extending in substantially horizontal planes adjacent the mine floor, devices upon the frame to actuate the several elements of the machine, an elongated gathering bar extending parallel with and adjacent the advancing side of the conveyer and adapted to revolve about its longitudinal axis, and teeth upon the gathering bar adapted to engage material at the level of the mine floor and lift it onto said conveyer.

9. In a machine for loading coal in mines, the combination with a supporting frame adapted to rest upon and slide in any direction over the floor of the mine, an elongated conveyer having a receiving portion extending in horizontal planes adjacent the mine floor, devices upon the frame to actuate the several elements of the machine, and elongated gathering bars extending parallel with and adjacent to more than one edge of the conveyer and adapted to revolve about their longitudinal axes, and coal engaging teeth upon the gathering bars adapted to engage material at the level of the mine floor and lift it onto said conveyer.

10. In a machine for loading coal in mines, the combination with a supporting frame adapted to rest upon and slide in any direction over the floor of the mine, of an elongated conveyer having a receiving portion extending in horizontal planes adjacent the mine floor, devices upon the frame to actuate the several elements of the machine, and means associated with the receiving portion of the conveyer to take up the coal from the mine floor and place it upon said conveyer.

11. In a machine for loading coal in mines, the combination with a supporting frame adapted to rest upon and slide in any direction over the floor of the mine, of an elongated conveyer having a receiving portion extending in horizontal planes adjacent the mine floor, devices upon the frame to actuate the several elements of the machine, and a plurality of coal engaging elements arranged adjacent the edges of the receiving portion of the conveyer and adapted to upward and inward movement whereby the coal will be lifted from the mine floor onto the conveyer.

12. In a machine for loading coal in mines and the like, the combination of a portable frame movable over the mine floor, a conveyer on the frame extending to a point adjacent the forward end of the frame, and combined disintegrating and gathering means at the forward end of the frame comprising a positively driven rotatable member having about the periphery thereof disintegrating and conveyer teeth adapted to cut the coal and elevate the same directly onto the conveyer.

13. A loading machine, comprising in combination, a framework mounted for movement in different directions over a mining floor, a conveyer mechanism mounted upon the framework, and a plurality of rollers mounted adjacent the receiving end of the conveyer mechanism to deliver material from a pile against which said rollers are brought, onto said conveyer, one roller being arranged at an angle to the other roller and extending to a point adjacent the end of the latter, and means upon the rollers for directing the material lifted by the latter directly onto the conveyer.

14. In a machine for loading coal in mines, the combination of a portable frame adapted to be moved in different directions over the main floor, conveyer means on the frame having an operative portion adjacent the forward end thereof, and gathering means at the forward end of the frame comprising a plurality of toothed rollers arranged end to end at an angle to one another at the advancing side of the conveyer and at substantially the level of the mine floor, whereby the material in the rotatable movement of the said rollers will be elevated from the floor and deposited onto said conveyer means.

In testimony whereof we hereunto affix our signatures in the presence of two witnesses.

NEWTON L. BARGER.
JAMES P. DONALDSON.

Witnesses:
PATRICK J. RILEY,
DOUGLAS B. TURNER.